United States Patent [19]
Bielfeldt et al.

[11] 3,908,968
[45] Sept. 30, 1975

[54] MOUNTING AND ROTATING ASSEMBLY FOR THE AXIALLY SHIFTABLE SHAFT OF AN INJECTION MOLDING MACHINE

[75] Inventors: Friedrich Bernd Bielfeldt, Fischen; Wolfgang Schaa, Munich, both of Germany

[73] Assignee: Krauss-Maffei Aktiengesellschaft, Munich, Germany

[22] Filed: Dec. 26, 1973

[21] Appl. No.: 428,353

[30] Foreign Application Priority Data
Dec. 30, 1972   Germany............................ 2264315

[52] U.S. Cl. ............................................... 259/191
[51] Int. Cl.² ........................................... B29B 5/04
[58] Field of Search ....... 259/9, 10, 191; 425/242 R

[56] References Cited
UNITED STATES PATENTS
3,371,386   3/1968   Ludwig ............................... 259/191
3,492,700   2/1970   Kornmayer ..................... 425/242 X
3,729,280   4/1973   Hehl............................ 425/242 R X

*Primary Examiner*—Peter Feldman
*Assistant Examiner*—Alan Cantor
*Attorney, Agent, or Firm*—Karl F. Ross; Herbert Dubno

[57]    ABSTRACT

A rotating and axial-drive device for the plastifying worm or screw of an injection-molding machine operates with a hydraulic unit to effect axial displacement to drive the plastified resin into the mold. The drive end of the shaft is surrounded directly or via an intermediate shaft member, with an annular piston. The drive shaft is connected to the axially displaceable shaft by a spline arrangement within the piston assembly.

8 Claims, 2 Drawing Figures

MOUNTING AND ROTATING ASSEMBLY FOR THE AXIALLY SHIFTABLE SHAFT OF AN INJECTION MOLDING MACHINE

FIELD OF THE INVENTION

The present invention relates to a system for rotating and axially displacing the plastifying worm or screw of an injection molding machine and, more particularly, to an arrangement in which the screw shaft of such a machine is axially displaceable by fluid pressure.

BACKGROUND OF THE INVENTION

It is common practice in the injection-molding art to provide the injection-molding machine with an injection nozzle which cooperates with the mold and, in turn, is fed with plastified or flowable synthetic resin formong a plastifying or mastication chamber or cylinder communicating with this nozzle and receiving one or more screws or worms which advance the thermoplastic material toward the nozzle and at the same time apply shear and compression forces to the flowable mass which, in conjunction with shear heating or externally supplied heat, bring the mass into a flowable injectable and homogeneous consistency. The plastifying means may be provided with or may constitute the injection ram which is axially displaceable by fluid pressure, e.g., by an hydraulic source, to drive the flowable material through the nozzle and into the mold.

It has been found advantageous in most injection-molding systems using a plastifying worm, to mount the, or each, worm with axial mobility in the plastifier housing, so that the worm retracts during the plastifying stage between injection and is then driven forwardly by hydraulically applied force for the actual injection step.

This of course, requires that the shaft of the plastifying worm be mounted for axial mobility as well as rotation, that means be provided for axially displacing the shaft under hydraulic pressure.

In earlier systems it has been proposed to provide an annular piston to displace the shaft of the plastifying worm, the annular piston bearing at one end against the shaft and the other end being sealed to a stationary sleeve which was connected to the cylinder wall. The system was found to be relatively expensive and complex since carefully machined internal bores and external sliding surfaces were required and special care had to be taken to avoid excessive play between the piston and cylinder because of the extremely high pressures (150 to 200 Bars) which must be developed.

OBJECTS OF THE INVENTION

It is the principal object of the present invention to provide a system for the purposes described which will be free from the above mentioned disadvantage, i.e., can be manufactured at low cost and does not require intricate machining or close tolerances of difficult-to-machine parts as in the previous cases.

Another object of the present invention is to provide an improuved mounting system and arrangement for axially and rotatably displacing a plastifying worm in an injection-molding machine.

SUMMARY OF THE INVENTION

These objects and others which will become apparent hereinafter attained in accordance with the present invention, in a system in which the annular piston surrounds the end of the shaft to which is connected and has only external surfaces or only internal surfaces cooperating with only internal surfaces or external surfaces of the cylinder so that manufacturing costs of the system are reduced, the system is materially simplified and dimensional tolerances do not crete difficulties of the type heretofore encountered.

The invention comprises a system for axially displacing and rotating the shaft of a worm or screw of a plastifying apparatus for use in an injection-molding machine which comprises an annular piston surrounding the shaft end of the worm, which end may be formed by an intermediate shaft, and axially shiftable in a cylinder to which a fluid medium may be fed to displace the ram, the shaft being coupled to the output of a motor, preferably by a spline arrangement allowing the axial mobility.

In the region between its center and the end turned toward the plastifying screw, the annular piston is formed with a pair of control surfaces each of which is juxtaposed with a control surface of the cylinder; a control surface of the piston and a control surface of the cylinder together define opposite sides of a pressurizable compartment of variable axial width.

In this system the control surfaces are annular, surround the shaft and lie in planes perpendicular to the axis of the system.

Consequently, only an outer surface or an inner surface of the piston and on the cylinder a corresponding inner surface or an outer surface need be provided as sealing zones. Furthermore, the control surfaces are axially spaced from one another. This clearly simplifies the manufacture and assembly by limiting the machining requirements since the zone of the piston can be provided with sealing rings which span the clearance between the piston and the cylinder or sealing rings can be provided at the zone of the cylinder. The dimensional tolerances need not be as limited as heretofore.

The system completely eliminates the sleeve heretofore required for sealing purposes and permit the diameter of the cylinder to be reduced and, for this reason as well, simplifies the construction.

According to an important feature of the invention, the control surfaces of the annular piston are formed in an intermediate region along its length upon an annular flange as oppositely facing surfaces whereby the flange functions as a double acting piston ring. At each end of the cylinder, inwardly facing control surfaces may be provided. Furthermore, the seals on the piston may be provided along the cylindrical portions of this flange.

The latter construction facilitates construction of the device to admit both a forward and return stroke since the formation of the double-acting flange in the middle of the piston and two cylindrical uniform cross-section portions extending axially therfrom is especially inexpensive and simple to produce.

In cases in which the piston is not intended to rotate with the shaft, a relatively simple means can be provided to rotationally arrest the piston. Such means may include a cover for a bearing assembly at the end of the piston turned toward the wall and pair of lateral projections which slide in slots provided in the cylinder wall.

The system further permits the cross-sectional arrays of the surfaces effective for the forward and reverse strokes to be different and thereby permits a free choice of the forces which are to act on the piston and are produced by the pressure medium for the forward and reverse strokes.

In another embodiment of the invention, the flange may be an inwardly directed formation on the cylinder which engages the intermediate region of the piston and the seals on the latter may be provided in opposite axial ends, this flange also having double-acting surfaces. Here again the surfaces of the piston may have different radial extents to obtain desired cross-sectional areas and permit, for example, the forward stroke to be carried out at a large force while the return stroke is carried out with a smaller force using the same pressure of the fluid medium. Of course, in both embodiments, the control surfaces can be on the cylinder formed as an outwardly projecting flange while the control surfaces of the piston can be formed on an inwardly projecting flange.

BRIEF DESCRIPTION OF THE DRAWING

The above and other objects, features and advantages of the present invntion will become more readily apparent from the following description, reference being made to the accompanying drawing in which.

SPECIFIC DESCRIPTION

Figure 1:
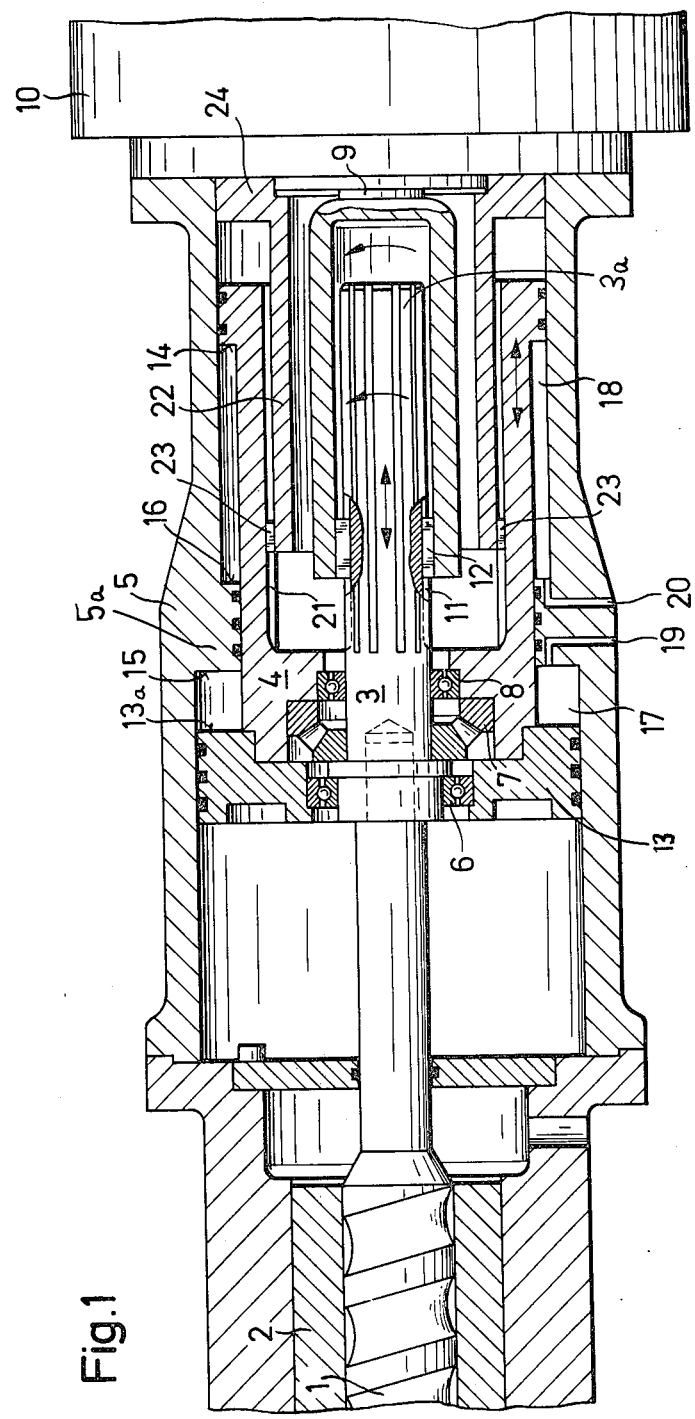
FIG. 1 is a axial cross-sectional view through a mechanism for the axial displacement and the rotational displacement of the shaft of the plastifying worm of an injection-molding machine according to the present invention.

In FIG. 1 we have shown a system in which the plastifying cylinder 2 of an injection molding machine (for communications with the injection nozzle and mold at the left hand end not shown) receives a plastifying worm or screw 1 which may have a constant pitch or a variable pitch.

At the right hand end of the device, the worm 1 is formed with an intermediate shaft 3 which is jounaled by bearings 6, 7 and 8 in a piston assembly axially displaceable in the cylinder housing 5 rigid at the right hand end with the plastifying housing 2.

Bearings 6 and 8 are conventional radial bearings adapted to withstand radial pressure while bearing 7 is a combined thrust and radial bearing and thus is adapted to withstand both radial and axial forces while permitting relative rotation of the piston assembly and the shaft.

The annular piston assembly comprises a cylindrical piston 4 which is axially elongated and bears upon or is connected with a piston 13 of larger diameter as will be described in greater detail hereinafter.

The right hand end of intermediate shaft 3 is provided with splines 3a whose grooves 11 receive the inwardly directed teeth of a hollow drive shaft 9 in which the splined end 3a of the plastifying shaft 1, 3 projects axially. The drive shaft 9 is rotated by an electric motor or hydraulic motor represented at 10 and flanged axially to the housing 5, preferably via a speed reduction intermission.

The annular piston 4, which can be fixed to the shaft 3 and rotatable therewith should bearings 6 through 8 be omitted, is formed at its left hand end with a large-diameter piston 13 as previously described which has a surface 13a exposed to hydraulic pressure and defining a pressurizable compartment 17 with a surface 15 of the cylinder housing 5. The latter surface is formed on an annular wall 5a which also defines the oppositely effective surface 16 of a pressurizable compartment 18 in which the surface 14 of the right hand end of piston 4 is exposed. The surfaces 13–16 are all annular and lie in planes perpendicular to the axis of the device. The housing 5 thus has double-acting effective surfaces 15–16 as will be described in greater detail hereinafter.

The pressurizable compartments 17 and 18 are supplied with the hydraulic fluid via passages 19 and 20. When hydraulic fluid is introduced through passage 19 into compartment 17, the piston 4 is displaced to the right and drives the plastifying material through the injection nozzle. During the return stroke, fluid is displaced from compartment 17 and is admitted to compartment 18 through passage 20 to permit controlled movement of the piston 4 to the right. The differences in the effective crosssectional areas of the surfaces 13–15 and 14–16 determines the different forces for the forward stroke and the return stroke.

The annular piston 4 is prevented in the embodiment illustrated in FIG. 1 from rotating by two grooves 21 formed in the inner surface of the annular piston and engaged by a pair of adjusting springs 23 carried by a thin-walled sleeve 22 extending axially into the piston in the space between the shaft 9 and the inner wall of the piston. Thus relative axial movement of the piston and housing is permitted without relative angular displacement. Of course, with removal of the bearings 6 through 8 and rotational coupling of the piston with the shaft 1, 3, members 21 through 23 will also be eliminated.

The sleeve 22 is formed at its right hand end with an annular flange 23 anchored to the motor 22 and filling the space between the bearing of shaft 9 and the inner wall of the housing 5.

Figure 2:
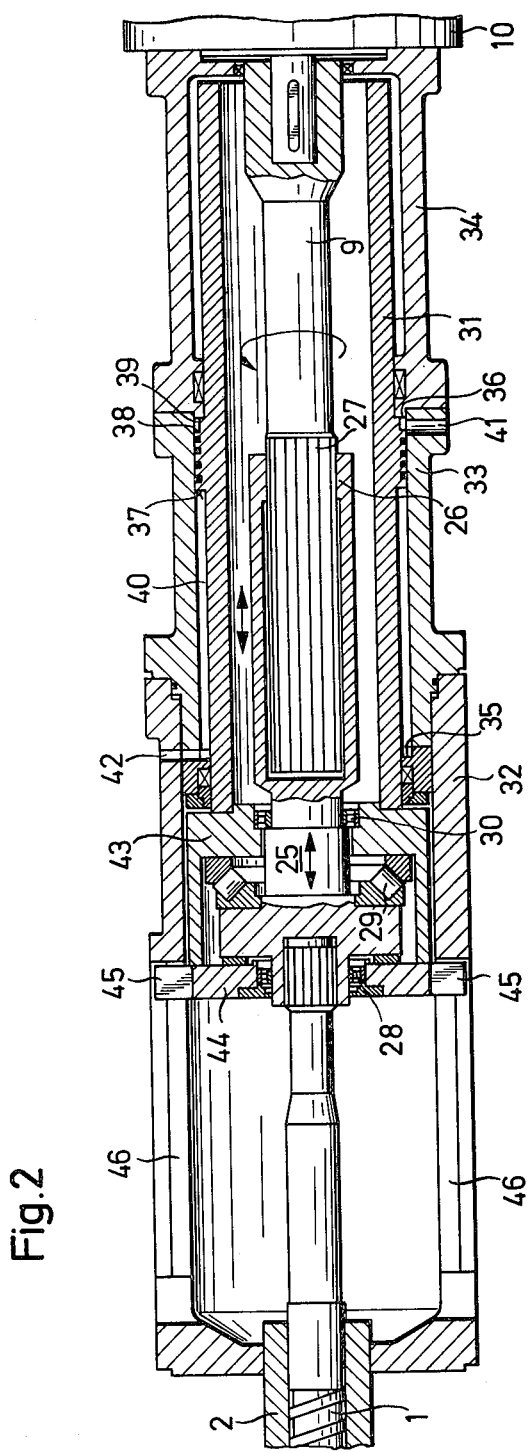
FIG. 2 is an axial cross-sectional view similar to FIG. 1 but illustrating a mechanism according to another embodiment of the invention.

In FIG. 2 we have shown a second embodiment in which the plastifier housing is represented at 2 and the plastifier work at 1 as previously described. In this embodiment, the parts bearing the same reference numerals as those of FIG. 1 are functionally identical therewith.

The intermediate shaft 25 of this structure, however, differs from those of FIG. 1 in that the right hand end of the intermediate shaft is formed as a socket or sleeve with internal teeth 26 which engage the external splines of the shaft 9 driven by the motor 10. The splines 27 are thus provided on the left hand end of the drive shaft 9.

Roller bearings 28, 29 and 30 and a bearing ring 43 connect the annular piston 31 with the intermediate shaft 25. The cylinder housing, in which the piston 31 is axially displaceable, is formed by the interconnected cylinder members 32, 33 and 34.

Cylinder members 34, upon which the drive motor 10 is flanged, and cylinder member 33 each are formed with a control surface 35, 36 between which the piston 31 has a double acting control surface 37 and 38. The two pressurizable compartments 39 (for the forward stroke) and 40 (for the return stroke) are connected by passages 41 and 42 with fluid-pressure sources such as a compressor or hydraulic pump. The system, of course, operates in the manner described in connection with FIG. 1.

To prevent rotation of the piston 31 with the screw 1, a cover member 44 at a cup shaped end of the bearing ring 43 is provided with projections 45, each fitting into a slot 46 of the stationary cylinder member 32.

We claim:

1. An injection-molding machine comprising in combination:
   a. a plastifier housing, and at least one worm rotatably and axially shiftably received in said housing and having an axially extending shaft;
   b. a cylinder member nondisplaceable with respect to said housing and receiving said shaft;
   c. an annular piston member axially displaceable in said cylinder member and surrounding said shaft while being connected to said shaft for displacement of said worm in axial direction,
   d. said cylinder member and said piston member defining a pressurizable compartment for the forward movement of said worm having a pair of oppositely effective annular surfaces arranged on said cylinder member and said piston member respectively,
   e. said surface arranged on said piston member being provided as an annular flange on the end of said piston member facing in the direction of said worm, said surface arranged on said cylinder member being provided as an annular flange facing away from said worm;
   f. an axially non displaceable drive arrangement attached to the free end of said cylinder member and having a further shaft extending axially therein; and
   g. means for rotationally coupling said shafts within said piston member but for permitting a longitudinal movement of said shafts relative to one another.

2. The combination defined in claim 1 wherein said flange is formed on said cylinder member and said piston member is provided with its said surfaces at opposite ends.

3. The combination defined in claim 1, further comprising bearing means between said shaft of said worm and said piston member, and means restricting rotation of said piston member in said cylinder.

4. The combination defined in claim 3 wherein the last-mentioned means includes a sleeve extending axially into said piston member and formed with an outward projection, said piston member being formed with an internal groove slideably receiving said projection.

5. The combination defined in claim 3 wherein the last-mentioned means includes a projection formed on said piston member and a groove formed on said cylinder member and slideably receiving said projection.

6. The improvement defined in claim 1 wherein said means for rotationally coupling said shafts includes a spline formed on one of said shafts and an array of teeth received in said spline on the other shaft.

7. An injection-molding machine comprising in combination:
   a. a plastifier housing, and at least one worm rotatably and axially shiftably received in said housing and having an axially extending shaft;
   b. a cylinder member nondisplaceable with respect to said housing and receiving said shaft and fastened to said housing against movement relative thereto;
   c. an annular piston member axially displaceable in said cylinder member and surrounding said shaft while being connected to said shaft for displacement of said worm in axial direction,
   d. said cylinder member and said piston member comprising a pressurizable compartment for the forward movement of said worm and having a pair of oppositely effective annular surfaces respecitvely arranged on said cylinder member and said piston member,
   e. said surfaces being provided as annular flanges substantially at the middle of said piston member and of said cylinder member respectively, said surface arranged on said cylinder member facing away from said worm and lying on the opposite side of the surface arranged on said piston member from said worm;
   f. a drive arrangement attached to the free end of said cylinder member and axially nondisplaceable relative thereto, said drive arrangement having a further shaft extending axially in said cylinder member; and
   g. means for rotationally coupling said shafts within said piston member but permitting longitudinal relative movement of said shafts.

8. A combination defined in claim 7 wherein said annular flange on said piston member forms a third annular surface lying to the opposite side of said surface of said cylinder member from the first mentioned surface on said piston member, said third surface forming part of a further pressurizable compartment for the rearward movement of said worm, said further compartment being closed opposite said third surface by a fourth annular surface arranged on the cylinder member and facing toward said worm.

* * * * *